(12) United States Patent  
Ziebarth et al.

(10) Patent No.: US 12,296,333 B2
(45) Date of Patent: May 13, 2025

(54) HYBRID GLASS PLASTIC FLOW CELL AND FABRICATION METHODS

(71) Applicant: Illumina, Inc., San Diego, CA (US)

(72) Inventors: Jonathan Ziebarth, La Jolla, CA (US); Jon Aday, Escondido, CA (US); Paul Crivelli, San Diego, CA (US); Gerald Kreindl, Sankt Florian am Inn (AT); Amit Sharma, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 207 days.

(21) Appl. No.: 18/003,284

(22) PCT Filed: Feb. 18, 2022

(86) PCT No.: PCT/US2022/070738
§ 371 (c)(1),
(2) Date: Dec. 23, 2022

(87) PCT Pub. No.: WO2022/178542
PCT Pub. Date: Aug. 25, 2022

(65) Prior Publication Data
US 2023/0249176 A1    Aug. 10, 2023

Related U.S. Application Data

(60) Provisional application No. 63/151,875, filed on Feb. 22, 2021.

(51) Int. Cl.
B29C 45/14    (2006.01)
B01L 3/00     (2006.01)
B29C 45/00    (2006.01)

(52) U.S. Cl.
CPC .. *B01L 3/502707* (2013.01); *B29C 45/14778* (2013.01); *B01L 2300/0896* (2013.01); *B29C 2045/0094* (2013.01)

(58) Field of Classification Search
CPC ....... B01L 3/502707; B01L 2300/0896; B29C 45/14778; B29C 2045/0094
See application file for complete search history.

(56) References Cited

U.S. PATENT DOCUMENTS

| | | | |
|---|---|---|---|
| 2003/0044320 A1* | 3/2003 | Luo | B01J 19/0046 422/65 |
| 2009/0283844 A1* | 11/2009 | Sparks | G01F 1/8445 257/E23.18 |
| 2015/0005447 A1 | 1/2015 | Berti et al. | |
| 2015/0093303 A1* | 4/2015 | Tsai | B01L 3/502707 422/503 |

FOREIGN PATENT DOCUMENTS

CN    110935493 A    3/2020

* cited by examiner

*Primary Examiner* — Vishal I Patel
(74) *Attorney, Agent, or Firm* — Heslin Rothenberg Farley & Mesiti P.C.

(57) ABSTRACT

Provided herein include various examples of a method for manufacturing aspects of flow cell. The method may include performing chemical processes on a surface of the patterned wafer to prepare the surface of the patterned, singulating the wafer into individual dies, orienting each die on a temporary substrate, where the orienting creates spaces between each individual die, and molding a material over the spaces to create a hybrid wafer comprised of glass and molded material. The method may also include bonding two of the hybrid wafers together, forming a bonded wafer stack.

11 Claims, 11 Drawing Sheets

HYBRID GLASS PLASTIC FLOW CELL AND FABRICATION METHODS

CROSS REFERENCE TO RELATED APPLICATIONS

This application is a national stage filing under Section 371 of International Application No. PCT/US2022/070738, filed on Feb. 18, 2022, published on Aug. 25, 2022 as WO 2022/178542 and which claims priority from U.S. Provisional Patent Application No. 63/151,875, filed Feb. 22, 2021, the entire disclosures of which are incorporated herein by reference.

BACKGROUND

Various protocols in biological or chemical research involve performing controlled reactions. The designated reactions can then be observed or detected and subsequent analysis can help identify or reveal properties of chemicals involved in the reaction. In some multiplex assays, an unknown analyte having an identifiable label (e.g., fluorescent label) can be exposed to thousands of known probes under controlled conditions. Each known probe can be deposited into a corresponding well of a microplate. Observing any chemical reactions that occur between the known probes and the unknown analyte within the wells can help identify or reveal properties of the analyte. Other examples of such protocols include known DNA sequencing processes, such as sequencing-by-synthesis (SBS) or cyclic-array sequencing.

In some fluorescent-detection protocols, an optical system is used to direct excitation light onto fluorophores, e.g., fluorescently-labeled analytes and to also detect the fluorescent emissions signal light that can emit from the analytes having attached fluorophores. In other proposed detection systems, the controlled reactions in a flow cell are detected by a solid-state light sensor array (e.g., a complementary metal oxide semiconductor (CMOS) detector). In other systems, a glass die is utilized as an imaging or other detection surface. These systems do not involve a large optical assembly to detect the fluorescent emissions. The shape of the fluidic flow channel in a flow cell may determine its utility for various uses, for example, SBS or cyclic-array sequencing is enabled in a sensor system utilizing multiple liquid flows, and thus, a fluidic flow channel of specific shape is utilized for SBS or cyclic-array sequencing.

When patterned glass wafers are utilized to fabricate flow cells, where a die cut from the patterned glass wafer served as at least part of an active surface, including but not limited to, an active imaging area, much of the glass wafer is wasted once the die is delineated.

SUMMARY

Accordingly, it may be beneficial to fabricate hybrid (glass and plastic or another moldable material) flow cells that include glass dies from a patterned wafer and provide multiple lanes for the flow cells because these methods would: 1) increase utilization of expensive nanopatterned glass wafers (e.g., reduce fixed cost (FC) and cost of goods (COGs)); 2) increase the flexibility for nanopatterned wafers, by, for example, enabling utilization of the same nano-imprint lithography (NIL) template for multiple form factors; and/or 3) allow for new fluidic channel designs, which may improve flushing efficiency, reduce reagent consumption, and decrease fluidic cycle times.

Thus, shortcomings of the prior art can be overcome and benefits as described later in this disclosure can be achieved through the provision of a method for forming aspects of a flow cell. Various examples of the method are described below, and the method, including and excluding the additional examples enumerated below, in any combination (provided these combinations are not inconsistent), overcome these shortcomings. In some examples herein, the method comprises: for each patterned wafer of at least two patterned wafers: performing chemical processes on a surface of the patterned wafer to prepare the surface of the patterned wafer to add specific chemical functionality to the surface; singulating the wafer into individual dies, wherein each individual die comprises an active area of a given flow cell; orienting each die on a temporary substrate, wherein the orienting creates spaces between each individual die; and molding a material over the spaces such that a top surface of the molded material is contiguous with a portion of the top surface of each active area to create a hybrid wafer comprised of glass and molded material; and bonding a first hybrid wafer formed from a first patterned wafer of the at least two patterned wafers to a second hybrid wafer formed from a second patterned wafer of the at least two patterned wafers, wherein the bonding couples the top surface of the molded material of the first hybrid wafer to the top surface of the molded material of the second hybrid wafer, forming a bonded wafer stack.

In some examples, the two or more patterned wafers are selected from the group consisting of: circular wafers and non-circular panels.

In some examples, the two or more patterned wafers comprise glass.

In some examples, singulating comprises perforating the patterned wafer utilizing a technique selected from the group consisting of: laser dicing the patterned wafer, saw dicing the patterned wafer, and scribe and break processing the patterned wafer.

In some examples, the technique comprises laser dicing and the laser dicing comprises: laser dicing the patterned wafer to create perforations between the dies; and separating the patterned wafer into the dies at those perforations.

In some examples, the orienting is accomplished by utilizing a pick and place process.

In some examples, the bonding comprises utilizing a double-sided adhesive, and a thickness of the double sided adhesive creates a space between the top surface of the molded material of the first hybrid wafer and the top surface of the molded material of the second hybrid wafer, for a fluidic channel.

In some examples, the method includes dicing the bonded wafer stack to form at least one flow cell.

In some examples, the molding further comprises drilling holes in the molded material as fluidic inlets and outlets for the at least one flow cell.

In some examples, the material utilized in the molding comprises plastic.

In some examples, molding the material over the spaces comprises overmolding the material on the temporary substrate and curing the material.

In some examples, each flow cell of the at least one flow cell comprises between 1 to 6 active areas.

In some examples, performing the chemical processes comprises coating the patterned wafer with one or more functional layers.

In some examples, performing the chemical processes comprises: treating the surface of the patterned wafer; coating the surface of the patterned wafer with a hydrogel; and polishing the surface of the patterned wafer.

In some examples, the temporary substrate comprises an adhesive.

In some examples, singulating the wafer into the individual dies comprises: singulating the wafer into an initial set of singulated dies; and singulating each die of the initial set of singulated dies into one or more pieces, wherein the one or more pieces of each die of the initial set of singulated dies comprise the individual dies.

As aforementioned, shortcomings of the prior art can be overcome and benefits as described later in this disclosure can be achieved through the provision of a method for forming aspects of a flow cell. Various examples of the method are described below, and the method, including and excluding the additional examples enumerated below, in any combination (provided these combinations are not inconsistent), overcome these shortcomings. In some examples herein, the method comprises: for each patterned wafer of at least two patterned wafers: singulating the wafer into individual dies, where each die comprises an active area of a given flow cell; and orienting each individual die on a temporary substrate, where the orienting creates spaces between each individual die; and molding a material over the spaces such that a top surface of the molded material is contiguous with a portion of the top surface of each active area to create a hybrid wafer comprised of glass and molded material; and performing chemical processes on a surface of the hybrid wafer to add specific chemical functionality to the surface; and bonding a first hybrid wafer formed from a first patterned wafer of the at least two patterned wafers to a second hybrid wafer formed from a second patterned wafer of the at least two patterned wafers, where the bonding couples the top surface of the molded material of the first hybrid wafer to the top surface of the molded material of the second hybrid wafer, forming a bonded wafer stack.

In some examples of the method described above, the two or more patterned wafers are selected from the group consisting of: circular wafers and non-circular panels.

In some examples of the method described above, the two or more patterned wafers comprise glass.

In some examples of the method described above, the singulating comprises perforating the patterned wafer utilizing a technique selected from the group consisting of: laser dicing the patterned wafer, saw dicing the patterned wafer, and scribe and break processing the patterned wafer.

In some examples of the method described above, the technique comprises laser dicing and the laser dicing comprises: laser dicing the patterned wafer to create perforations between the dies; and separating the patterned wafer into the dies at those perforations.

In some examples of the method described above, the orienting is accomplished by utilizing a pick and place process.

In some examples of the method described above, the bonding comprises utilizing a double-sided adhesive, where a thickness of the double sided adhesive creates a space between the top surface of the molded material of the first wafer stack and the top surface of the molded material of the second wafer stack for a fluidic channel.

In some examples of the method described above, the method also includes: dicing the bonded wafer stack to form at least one flow cell.

In some examples of the method described above, the molding further comprises drilling holes in the molded material as fluidic inlets and outlets for the at least one flow cell.

In some examples of the method described above, the material utilized in the molding comprises plastic.

In some examples of the method described above, molding the material over the spaces comprises overmolding the material on the temporary substrate and curing the material.

In some examples of the method described above, each flow cell of the at least one flow cell comprises between 1 to 6 active areas.

In some examples of the method described above, performing the chemical processes comprises coating the patterned wafer with one or more functional layers.

In some examples of the method described above, performing the chemical processes comprises: treating the surface of the patterned wafer; coating the surface of the patterned wafer with a hydrogel; and polishing the surface of the patterned wafer.

In some examples of the method described above, the temporary substrate comprises an adhesive.

In some examples of the method described above, singulating the wafer into the individual dies comprises: singulating the wafer into an initial set of singulated dies and singulating each die of the initial set of singulated dies into one or more pieces, where the one or more pieces of each die of the initial set of singulated dies comprise the individual dies.

As aforementioned, shortcomings of the prior art can be overcome and benefits as described later in this disclosure can be achieved through the provision of a method for forming aspects of a flow cell. Various examples of the method are described below, and the method, including and excluding the additional examples enumerated below, in any combination (provided these combinations are not inconsistent), overcome these shortcomings. In some examples herein, the method comprises: dicing a patterned wafer into dies comprising active surfaces; singulating the dies based on perforations created by the dicing; assembling each die into a flow cell, the assembling comprising: picking and placing the die into an injection molded flow channel formed in a molded flow cell bottom; and covering a top surface of molded flow cell bottom with a molded flow cell lid.

In some examples of the method described above, the die comprises imaging glass.

In some examples of the method described above, the method also includes performing chemical processes on a surface of the patterned wafer to prepare the surface of the patterned wafer to add specific chemical functionality to the surface.

In some examples of the method described above, the method also includes securing the die into the molded flow channel.

In some examples of the method described above, the securing is accomplished utilizing a fastener selected from the group consisting of: an epoxy and a heat stake.

In some examples of the method described above, dicing the patterned wafer into the dies comprising the active surfaces comprises: dicing the patterned wafer into an initial set of singulated dies and dicing each die of the initial set of singulated dies into one or more pieces, where the one or more pieces of each die of the initial set of singulated dies comprise the active surfaces.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
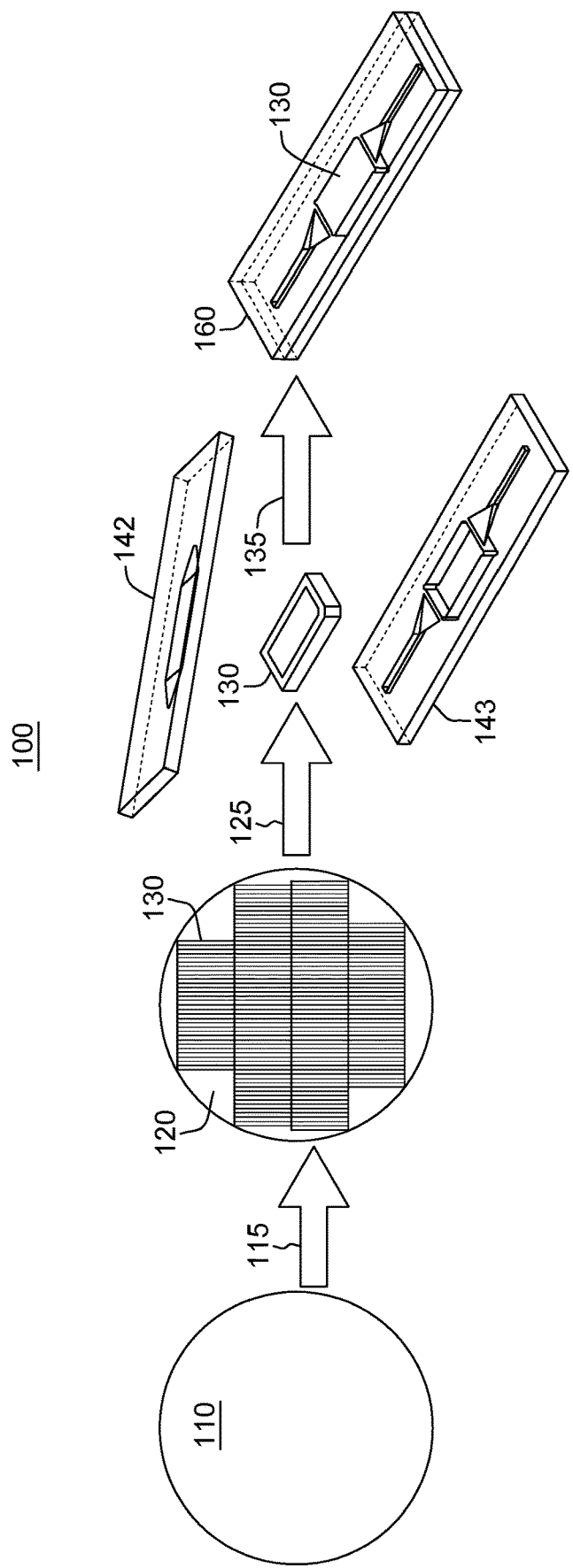
FIG. 1 depicts examples of a method of forming flow cells where a molded portion of the flow cell is completed before the portion of the cell is integrated into the flow cell.

The accompanying figures, in which like reference numerals refer to identical or functionally similar elements throughout the separate views and which are incorporated in and form a part of the specification, further illustrate the present implementation and, together with the detailed description of the implementation, serve to explain the principles of the present implementation. As understood by one of skill in the art, the accompanying figures are provided for ease of understanding and illustrate aspects of certain examples of the present implementation. The implementation is not limited to the examples depicted in the figures.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively", or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to 0.1%, such as less than or equal to ±0.05%. If used herein, the terms "substantially", "approximately", "about", "relatively," or other such similar terms may also refer to no fluctuations, that is, ±0%.

As used herein, a "flow cell" can include a device having a lid extending over a reaction structure to form a flow channel therebetween that is in communication with a plurality of reaction sites of the reaction structure, and can optionally include a detection device that detects designated reactions that occur at or proximate to the reaction sites. A flow cell may include a solid-state light detection or "imaging" device, such as a Charge-Coupled Device (CCD) or Complementary Metal-Oxide Semiconductor (CMOS) (light) detection device. For example, the image sensor structure of a sensor system can include an image layer disposed over a base substrate. The image layer may be a dielectric layer, such as SiN and may contain an array of light detectors disposed therein. A light detector as used herein may be, for example, a semiconductor, such as a photodiode, a complementary metal oxide semiconductor (CMOS) material, or both. The light detectors detect light photons of emissive light that is emitted from the fluorescent tags attached to the strands supported in or on the reaction sites, for example, in nanowells. The base substrate may be glass, silicon or other like material. As another specific example, a flow cell can fluidically and electrically couple to a cartridge (having an integrated pump), which can fluidically and/or electrically couple to a bioassay system. A cartridge and/or bioassay system may deliver a reaction solution to reaction sites of a flow cell according to a predetermined protocol (e.g., sequencing-by-synthesis), and perform a plurality of imaging events. For example, a cartridge and/or bioassay system may direct one or more reaction solutions through the flow channel of the flow cell, and thereby along the reaction sites. At least one of the reaction solutions may include four types of nucleotides having the same or different fluorescent labels. In some examples, the nucleotides bind to the reaction sites of the flow cell, such as to corresponding oligonucleotides at the reaction sites. The cartridge and/or bioassay system in these examples then illuminates the reaction sites using an excitation light source (e.g., solid-state light sources, such as light-emitting diodes (LEDs)). In some examples, the excitation light has a predetermined wavelength or wavelengths, including a range of wavelengths. The fluorescent labels excited by the incident excitation light may provide emission signals (e.g., light of a wavelength or wavelengths that differ from the excitation light and, potentially, each other) that may be detected by the light sensors of the flow cell.

Flow cells described herein perform various biological or chemical processes. More specifically, the flow cells described herein may be used in various processes and systems where it is desired to detect an event, property, quality, or characteristic that is indicative of a designated reaction. For example, flow cells described herein may include or be integrated with light detection devices, sensors, including but not limited to, biosensors, and their components, as well as bioassay systems that operate with sensors, including biosensors.

The flow cells facilitate a plurality of designated reactions that may be detected individually or collectively. The flow cells perform numerous cycles in which the plurality of designated reactions occurs in parallel. For example, the flow cells may be used to sequence a dense array of DNA features through iterative cycles of enzymatic manipulation and light or image detection/acquisition. As such, the flow cells may be in fluidic communication with one or more microfluidic channels that deliver reagents or other reaction components in a reaction solution to a reaction site of the flow cells. The reaction sites may be provided or spaced apart in a predetermined manner, such as in a uniform or repeating pattern. Alternatively, the reaction sites may be randomly distributed. Each of the reaction sites may be associated with one or more light guides and one or more light sensors that detect light from the associated reaction site. In one example, light guides include one or more filters for filtering certain wavelengths of light. The light guides may be, for example, an absorption filter (e.g., an organic absorption filter) such that the filter material absorbs a certain wavelength (or range of wavelengths) and allows at least one predetermined wavelength (or range of wavelengths) to pass therethrough. In some flow cells, the reaction sites may be located in reaction recesses or chambers, which may at least partially compartmentalize the designated reactions therein.

As used herein, a "designated reaction" includes a change in at least one of a chemical, electrical, physical, or optical property (or quality) of a chemical or biological substance of interest, such as an analyte-of-interest. In particular flow cells, a designated reaction is a positive binding event, such as incorporation of a fluorescently labeled biomolecule with an analyte-of-interest, for example. More generally, a designated reaction may be a chemical transformation, chemical change, or chemical interaction. A designated reaction may also be a change in electrical properties. In particular flow cells, a designated reaction includes the incorporation of a fluorescently-labeled molecule with an analyte. The analyte may be an oligonucleotide and the fluorescently-labeled molecule may be a nucleotide. A designated reaction may be detected when an excitation light is directed toward the oligonucleotide having the labeled nucleotide, and the fluorophore emits a detectable fluorescent signal. In another example of flow cells, the detected fluorescence is a result of chemiluminescence or bioluminescence. A designated reaction may also increase fluorescence (or Forster) resonance energy transfer (FRET), for example, by bringing a donor fluorophore in proximity to an acceptor fluorophore, decrease FRET by separating donor and acceptor fluorophores, increase fluorescence by separating a quencher from a fluorophore, or decrease fluorescence by co-locating a quencher and fluorophore.

As used herein, "electrically coupled" and "optically coupled" refers to a transfer of electrical energy and light waves, respectively, between any combination of a power source, an electrode, a conductive portion of a substrate, a droplet, a conductive trace, wire, waveguide, nanostructures, other circuit segment and the like. The terms electrically coupled and optically coupled may be utilized in connection with direct or indirect connections and may pass through various intermediaries, such as a fluid intermediary, an air gap and the like.

As used herein, a "reaction solution," "reaction component" or "reactant" includes any substance that may be used to obtain at least one designated reaction. For example, potential reaction components include reagents, enzymes, samples, other biomolecules, and buffer solutions, for example. The reaction components may be delivered to a reaction site in the flow cells disclosed herein in a solution and/or immobilized at a reaction site. The reaction components may interact directly or indirectly with another substance, such as an analyte-of-interest immobilized at a reaction site of the flow cell.

As used herein, the term "reaction site" is a localized region where at least one designated reaction may occur. A reaction site may include support surfaces of a reaction structure or substrate where a substance may be immobilized thereon. For example, a reaction site may include a surface of a reaction structure (which may be positioned in a channel of a flow cell) that has a reaction component thereon, such as a colony of nucleic acids thereon. In some flow cells, the nucleic acids in the colony have the same sequence, being for example, clonal copies of a single stranded or double stranded template. However, in some flow cells a reaction site may contain only a single nucleic acid molecule, for example, in a single stranded or double stranded form.

The terms "active surface" and "active area" are used herein to characterize a surface or area of a reaction structure which operates to support one or more designation reactions. Throughout this disclosure, the terms die and wafer are also used in reference to certain examples herein, as a die can include a sensor and the die is fabricated from a wafer. The words wafer and substrate are also used interchangeably herein.

The term "fan-out" is used herein to characterize an area that is packaged with a detector that extends a horizontal distance beyond the detector when the detector is a complementary metal-oxide-semiconductor (CMOS). For example, in examples where a sensor is utilized as a detector in the flow cell, the fan-out refers to the additional horizontal distance on each side of the horizontal boundaries of the sensor. In some examples of flow cells, the term "fanout" is utilized because electrical contacts are 'fanned out' from a die or active area in a semiconductor device. Herein, when the examples do not include fanned out electrical contacts, the term "molded or overmolded region" is utilized to characterize an area that is packaged with a detector that extends a horizontal distance beyond the detector.

Reference is made below to the drawings, which are not drawn to scale for ease of understanding, wherein the same reference numbers are used throughout different figures to designate the same or similar components.

As will be discussed herein, standard industry approaches to creating flow cells for imaging with glass used in the image sensors lead to a lot of waste of materials. Hence, a need exists for a process that makes more efficient use of the materials, including methods for forming flow cells with glass wafers (used, e.g., for imaging) that provide this benefit. Apart from imaging, glass wafer can be utilized in different types of flow cells, but the waste material issue remains consistent. FIGS. 1-7 herein illustrate various examples of methods for more efficiently utilizing a wafer in forming flow cells. Meanwhile, FIGS. 8-11 contrast the disclosed examples with certain standard practices, demonstrating, among other things, an increased utilization and efficiency in the examples disclosed herein.

Examples herein provide an approach to designing nanopatterned wafer with active areas to increase density and utilization of the wafer. In these examples, after wafer processing is complete, the active areas are diced (e.g., laser diced, saw diced, and/or separated with a scribe and break processes) out from the wafer and then packaged into fluidic channels. Hence, disclosed herein are various examples of workflows for creating a wafer utilized in a flow cell where certain aspects provide benefits not realized in the examples discussed above. Included herein are examples of hybrid (i.e., glass and plastic) flow cell structures and manufacturing workflows that provide various advantages including but not limited to: 1) increasing utilization of expensive nanopatterned glass wafers (e.g., reducing fixed cost (FC) and cost of goods (COGs)); 2) increasing the flexibility for nanopatterned wafers, by, for example, enabling utilization of the same nano-imprint lithography (NIL) template for multiple form factors; and/or 3) allowing for new fluidic channel designs, which may improve flushing efficiency, reduce reagent consumption, and decrease fluidic cycle times. Hence, the examples of structures and methods discussed herein enable more efficient uses of a patterned wafer in forming flow cells.

Although many of the figures herein illustrate aspects of the examples disclosed with a circular wafer as a visual, this circular wafer was selected for consistency in illustration, only, and does not suggest any limitation to the shape of the wafers that can be utilized in the examples disclosed herein. The examples herein may also be applied to patterned panels that are not circular. As will be discussed herein, regardless of the shape of the wafer from which multiple lanes for flow cells are formed, portions of the wafer may be diced out and then then reconstituted/overmolded on a panel shaped substrate (e.g., temporary support tape, an adhesive, a temporary substrate, carrier wafer, and/or a platform). Each time a wafer is noted in the disclosure below, the recitation may also refer to a panel. In these examples, multiple lane flow cell options are provided from a single wafer.

Examples of the methods described herein include approaches to manufacturing a nanopatterned wafer with active areas implemented in a manner that increases the density and utilization of the wafer. Examples discussed herein include glass and plastic (hybrid) flow cells. Certain of these examples are flow cells that include regions that extend a horizontal distance beyond an active surface to provide fluidic benefits. These regions are referred to as molded or overmolded regions. By extending a flow channel in a flow cell with molded or overmolded regions, the use of the active areas in ensuring proper fluidics is reduced, as this functionality is handled, at least in part, by the molded or overmolded regions. FIG. 1 illustrates examples of a method of manufacturing/forming/fabricating flow cells where a molded portion of the flow cell is completed before a portion of a wafer is integrated into the flow cell. In contrast, in FIGS. 2-7, the plastic molding is done around singulated portions of a wafer (i.e., dies).

Referring to FIG. 1, in this example, after wafer processing is complete, active areas are diced out from the wafer and then packaged into fluidic channels of flow cells. Processes used to dice the wafer may include, but are not limited to laser dicing, saw dicing, and/or separating with a scribe and break processes. FIG. 1 illustrates various aspects of this non-limiting example. FIG. 1 illustrates aspects of some examples of a process 100 for manufacturing a flow cell 160 where an active surface 130 forms an imaging glass or another type of active surface, which is utilized in the fluidics of the flow cell 160. As depicted in FIG. 1, a patterned wafer 110 is diced (115) to create a diced (e.g., laser diced, saw diced, and/or separated with a scribe and break processes) patterned wafer 120 with active surfaces 130. Each active surface 130 is separated from the wafer (125) as dicing creates perforations, upon which each active surface 130 (e.g., imaging glass) may be separated from the diced patterned wafer 120. The active surfaces 130 are built into a hybrid flow cell 160 (135). In this example, the hybrid flow cell 160 is assembled by inserting imaging glass (i.e., an active imaging area 130) into a (e.g., plastic) molded bottom 143, and a (e.g., plastic) molded lid 142. To form the hybrid flow cell 160, in some examples, the glass active surface 130 may be picked and placed into an injection molded flow channel, like that in molded bottom 143. Various methods may be used to secure the active surface 130 into place, including but not limited to, an epoxy and/or a heat stake. Another approach discussed herein, in FIGS. 2-7, which secures an active surface 130 in place in a hybrid flow cell includes building a molded or overmolded area or region. The molded or overmolded region may also be understood as a fanout region.

FIGS. 2-7 illustrate various aspects of certain non-limiting examples of workflows that can be performed to form, fabricate, and/or manufacture hybrid glass and plastic flow cells that include molded or overmolded region. In these examples, a flow cell with a glass active surface is formed, in part, by adding thermoplastic resin around the glass active surface, resulting both in a flow cell with molded or overmolded region and with examples of processes that efficiently utilize wafers to generate these flow cells. In the resultant cells discussed in the examples of FIGS. 2-7, the portion of the flow cell that handles fluidics may include an active surface of one or more dies and at least a portion of the molded or overmolded region(s) in the flow cell(s). As is illustrated herein, examples of the illustrated methods provide multiple lane flow cell options from a single wafer. Examples of the methods illustrated in FIGS. 2-5 can utilize certain parts of existing techniques for creating molded or overmolded region in flow cells where the sensor is a complementary metal-oxide-semiconductor (CMOS), but these examples utilize imaging glass as a sensor or detector in the resultant flow cells. Unlike in flow cells that utilize a CMOS as a sensor, electrical contacts to a sensor, which in flow cells with a CMOS enable thermal transfer from the silicon wafer, are not needed. Hence, as illustrated herein, the molding or packaging processes are arguably simpler than certain fanout processes that may or may not be implemented in flow cells with a CMOS, as the formation of the electrical contacts introduces certain complexities that are not relevant to examples discussed herein.

As will be discussed in greater detail herein and illustrated in FIGS. 2-5, one difference between certain of the examples is timing associated with the implementation of surface chemistry (applied to the surface of a flow cell), which is applied to enable the resultant flow cell, with the sensor, to conduct and/or detect the desired reactions. In flow cells that are to be utilized for SBS, the surface is treated for SBS imaging purposes, but the chemistry may enable different functionality on the patterned surface. Hence, the chemistry adds specific chemical functionality to the patterned surface. Throughout this disclosure, applying chemistry to the wafers or portions thereof refers, at least in part, to coating the wafer with functional layers. This coating may include, but is not limited to, treating the surface of the patterned wafer (or portion of the patterned wafer), coating the surface of the patterned wafer (or a portion of the patterned wafer) with a hydrogel, and polishing the surface of the patterned wafer (or a portion of the patterned wafer). In some examples, patterned wafers are obtained, the chemistry is performed, the wafers are singulated (e.g., diced and then separated at the perforations formed in the dicing), each singulated section (filamented piece, die) is placed on adhesive (e.g., carrier tape, fanout tape, a temporary substrate, a platform, and/or an adhesive) and the molded or overmolded regions are built on the tape around the diced wafer. The stacks that are created are bonded (by bonding the stacks so they oppose each other in direction, forming a fluidic channel between wafer and the molded or overmolded region surfaces, on each reconstituted wafer), and the bonded wafer stacks are diced into flow cells. In some examples, the bonding to create the stacks is accomplished by utilizing a double-sided adhesive. Hence, a thickness of the double sided adhesive creates a space between the top surface of the molded material of the first wafer stack and the top surface of the molded material of the second wafer stack for a fluidic channel. In some other examples, the chemistry is performed after these bonded wafer stacks are created. As also discussed herein, to create the molded or overmolded regions of the bonded wafer stacks, plastic can be molded or overmolded and cured. Hence, these stacks can be understood as comprising bonded hybrid wafers. Some examples of these stacks comprise both glass and plastic.

Figure 2:
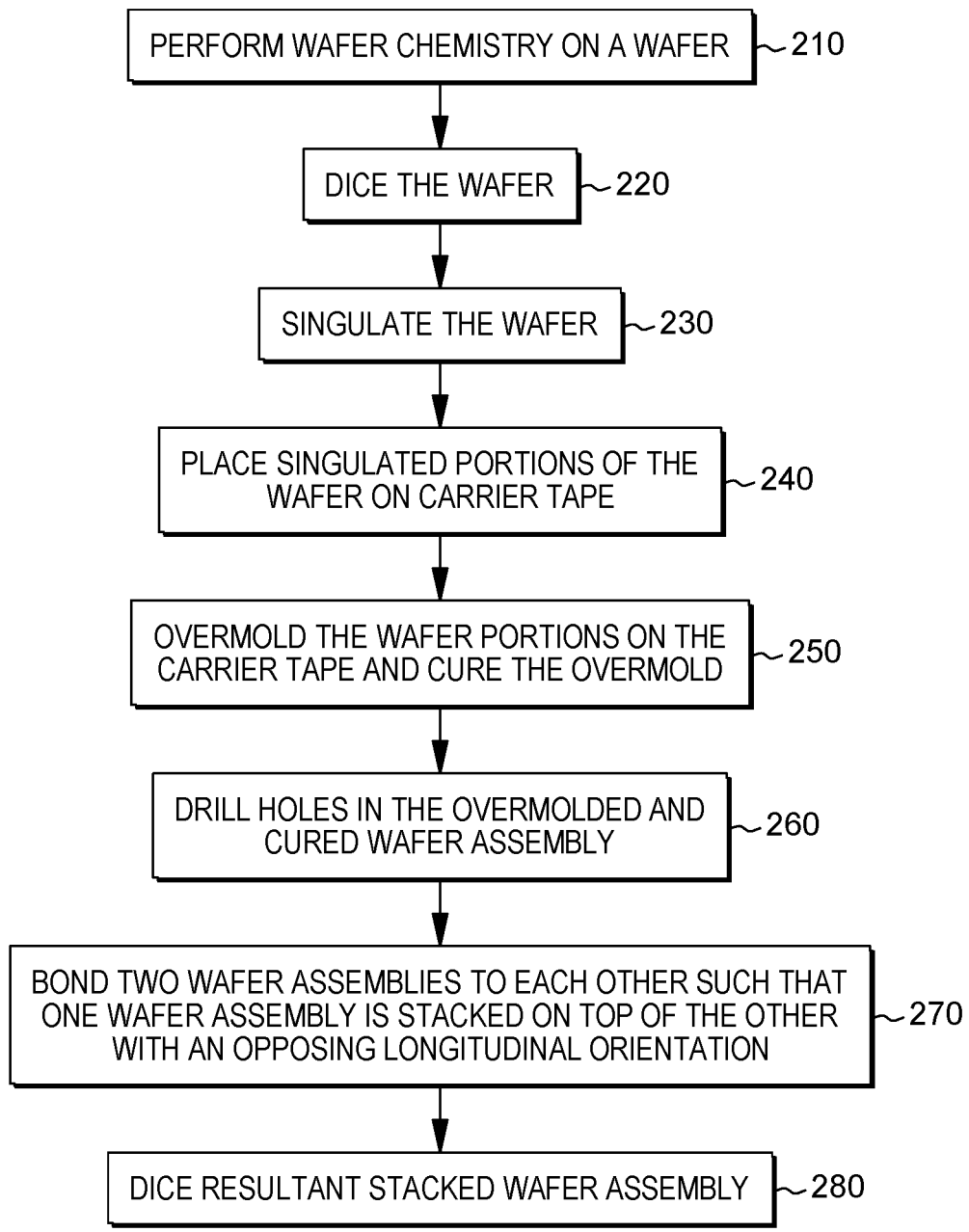
FIG. 2 illustrates various aspects of certain non-limiting examples of workflows that can be performed to form flow cells that include an overmolded or molded region.
Figure 3:
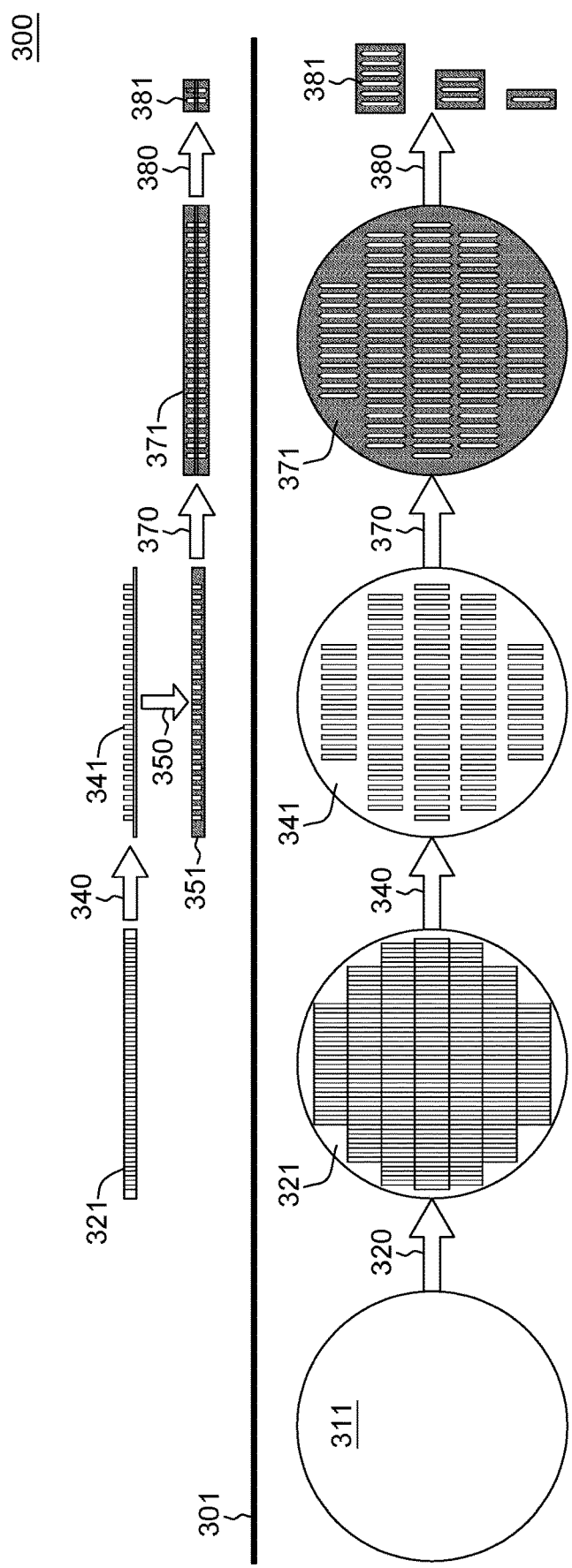
FIG. 3 illustrates various aspects of certain non-limiting examples of workflows that can be performed to form flow cells that include an overmolded or molded region.
Figure 4:
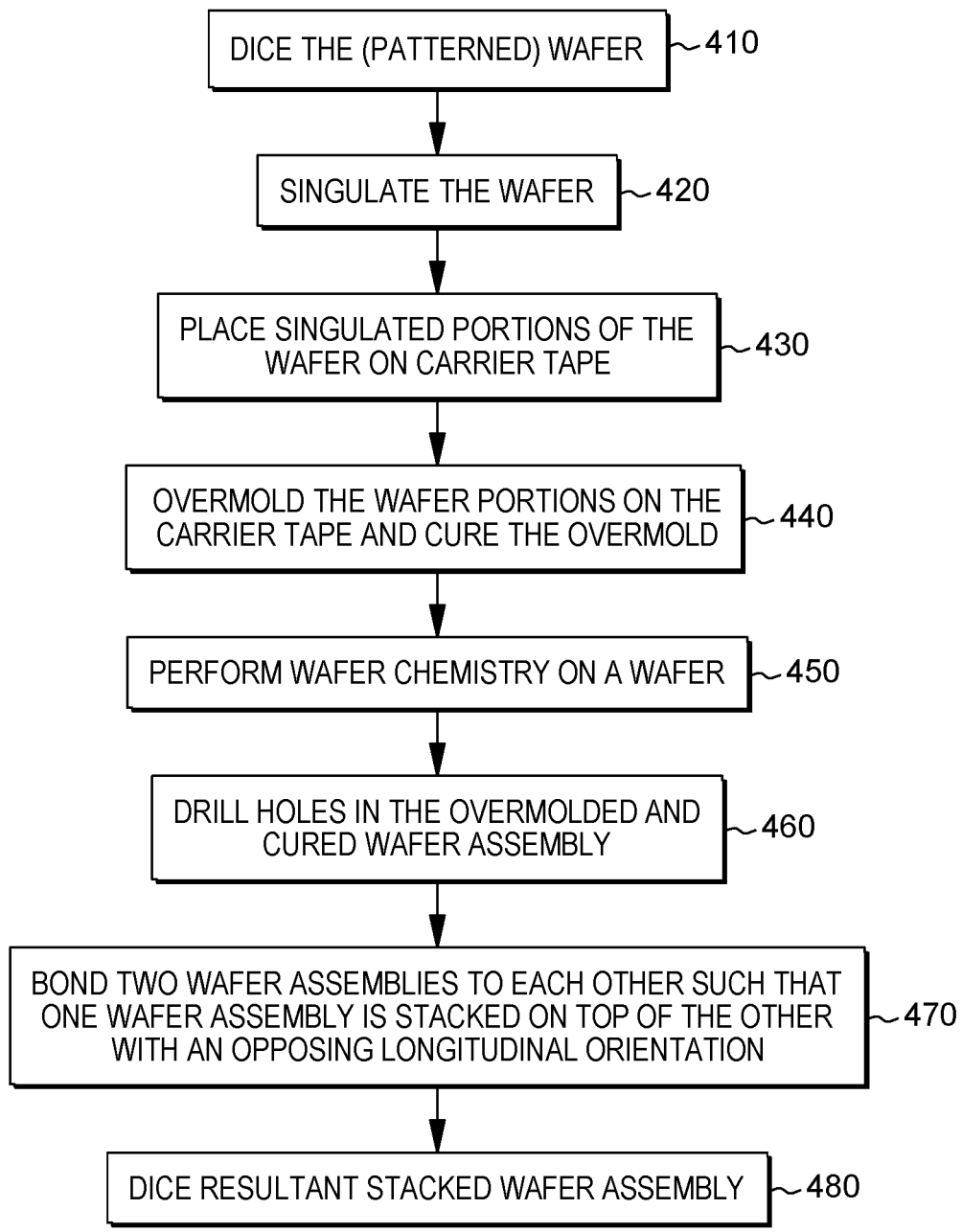
FIG. 4 illustrates various aspects of certain non-limiting examples of workflows that can be performed to form flow cells that include molded or overmolded region.
Figure 5:
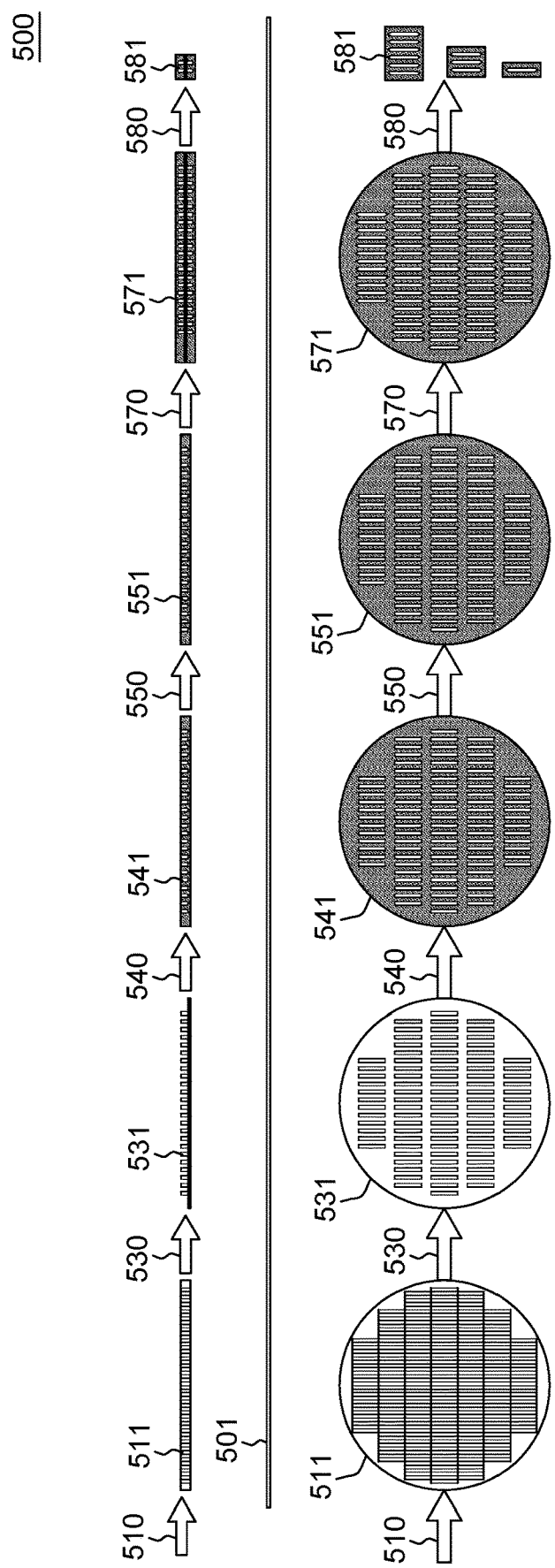
FIG. 5 illustrates various aspects of certain non-limiting examples of workflows that can be performed to form flow cells that include molded or overmolded region.

Referring to FIGS. 2-5, while FIG. 2 and FIG. 4 focus on textually demonstrating various aspects included in each example, FIG. 3 and FIG. 5 provide illustrations of the materials utilized in these examples as various points in each example. Thus, one can separately appreciate the progression of the workflows themselves with and without visuals to illustrate examples of various aspects. A difference between the process illustrated in FIGS. 2-3 and the process illustrated in FIGS. 4-5 is timing related to applying wafer chemistry to the wafer. In FIGS. 2-3, wafer chemistry is applied before the initial wafer is diced. In FIGS. 4-5, the wafer chemistry is applied after the wafer is diced. Applying wafer chemistry before the wafer is diced may be an effective approach provided the wafer chemistry has the stability to withstand the overmold process.

FIGS. 2-3 illustrates portions of a workflow of some examples of a method for manufacturing hybrid glass and plastic flow cells with the aforementioned molded or overmolded regions. While FIG. 3 is a recitation of parts of some examples of these methods, FIG. 2 provides illustrations of a glass wafer at various stages of these examples. As aforementioned, in the illustrated examples of FIGS. 2-3, wafer chemistry is performed before the wafer is diced (e.g., FIG. 1, 115) into imaging areas (e.g., FIG. 1, 130). Performing wafer chemistry before the dicing (e.g., FIG. 1, 115) may lower a cost of goods associated with these examples based on the utilization of the nanopatterned wafer and chemistry materials, when compared with existing methods as well as the other examples disclosed herein, have the highest (e.g., more efficient) utilization. Hence, applying wafer chemistry before the wafer is diced (e.g., FIG. 1, 115) is an effective approach including when the wafer chemistry has the stability to withstand the overmold process.

Referring to FIG. 2, as noted above, in the workflow 200 wafer chemistry is performed on a patterned wafer (210). The chemically treated wafer is then diced (e.g., laser diced, saw diced, and/or separated with a scribe and break processes) (220). The dicing may be adjusted to set parameters for the active surface of the flow cell in which a portion of the wafer will be implemented. The dicing creates perforations in the wafer such that the wafer is singulated along the perforations (230). The singulated portions of the wafer (e.g., dies) are placed on carrier wafer or tape, a temporary substrate or platform (e.g., utilizing a pick and place process) (240). The combination of the singulated portions of the original wafer placed on the carrier tape can be understood as reconstituted wafers. The placement of the singulated portions of the patterned wafer on the reconstituted wafer may be adjusted depending on the parameters and requirements of the resultant flow cell. The wafer portions on the carrier tape are then overmolded and the overmold is cured (250). The overmolded and cured wafer assembly is a hybrid glass and molded material substrate or wafer. In the overmolding and curing process, the spaces between the various portions of the wafer comprised of the molding tape are filled. Holes are drilled in the overmolded and cured wafer assembly to serve as fluidic inlets and outlets for the flow cell(s) (260). The two wafer assemblies are then bonded to each other such that one wafer assembly is stacked on top of the other with an opposing longitudinal orientation (270). To create a fluidic channel in the resultant flow cell, a double-sided adhesive is used for the bonding in order to create a space between the top surface of the molded material of the first wafer stack and the top surface of the molded material of the second wafer stack for a fluidic channel. The stacked wafer assembly, also referred to as a bonded wafer stack (comprised of bonded hybrid wafers), is diced (280). How many image areas are in the final diced product is dependent on the flow cell in which the final diced product will be utilized. In some examples, such as the example illustrated in FIG. 1, one patterned wafer yields several reconstituted wafers and two reconstituted wafers yields one bonded wafer stack.

FIG. 3 provides illustrations of various parts of the example workflow of FIG. 2. FIG. 3 includes a line 301 to separate different perspectives of a wafer at various stages in the workflow 200, 300. The illustrations above the line 301 are a side perspective of the wafer and the illustrations below the line 301 depict the top of the wafer at various stages in the example of a process disclosed herein. As the workflow 300 is described herein, references will also be made to the workflow 200 of FIG. 2 for ease of understanding and not to propose any limitations.

The workflow 300 of FIG. 3 commences with a wafer 311 upon which wafer chemistry has already been performed (e.g., FIG. 2, 210). The chemically treated wafer 311 is then diced (e.g., laser diced, saw diced, and/or separated with a scribe and break processes) (320) (e.g., FIG. 2, 220), resulting in a perforated wafer 321. As aforementioned, the dicing may be adjusted to set parameters for the active surface of the flow cell in which a portion of the wafer will be implemented. Based on the perforations created by dicing, the wafer is singulated into different portions (e.g., dies) (e.g., FIG. 2, 230), which are to become part of the active surfaces (together with the molded or overmolded regions) in flow cells. The singulated portions of the wafer are placed on carrier tape, a temporary substrate or platform (e.g., utilizing a pick and place process) (340) (e.g., FIG. 2, 240). This process results in a wafer assembly 341 (i.e., a reconstituted wafer) that includes singulated portions of the wafer being affixed to carrier tape with valleys between the different singulated portions upon which the molded or overmolded regions will be formed. The placement on the carrier tape may be adjusted depending on the parameters and requirements of the resultant flow cell. The molded or overmolded regions are formed by overmolding the wafer assembly and curing the overmold (350) (e.g., FIG. 2, 250). The resultant wafer package 351, after the curing of the overmold (e.g., a hybrid glass and molded material substrate or wafer), has an even or approximately even surface where the molded or overmolded regions and the singulated wafer portions are of comparable heights. The heights being equal or approximately equal is desirable as in some examples, the molded or overmolded regions and the singulated wafer portion form a surface that is one of the surfaces that may define a fluidic channel in a flow cell. Two wafer assemblies (i.e., hybrid wafers), both like the resultant wafer package 351 are then bonded to each other to form a bonded wafer stack 371 (comprised of hybrid wafers) (370) (e.g., FIG. 2, 270). To create a fluidic channel in the resultant flow cell, a double-sided adhesive is used for the bonding in order to create a space between the top surface of the molded material of the first wafer stack and the top surface of the molded material of the second wafer stack for a fluidic channel. As seen most clearly in the side view of the bonded wafer stack 371, the orientation of each wafer package 351 opposes the other, such that one mirrors the other over a horizontal axis (with the aforementioned space between the active surfaces for the fluidic channel). The stacked wafer assembly, also referred to as a bonded wafer stack, is diced into individual flow cells 381 (380) (e.g., FIG. 2, 280). Depending on how the stacked wafer assembly is diced, the workflow 300 provides different lane options. As aforementioned, how many image areas are in the final diced product (i.e., flow cell) is dependent on the type of flow cell in which the final diced product will be utilized.

Referring now to the examples of manufacturing hybrid glass and plastic flow cells with the aforementioned molded or overmolded regions illustrated in FIGS. 4-5, as aforementioned, the timing of applying the wafer chemistry differs from the examples in FIGS. 2-3. As with FIGS. 2-3, the examples in FIGS. 4-5 may or may not utilize various industry standard fanout process developed for CMOS wafers, but these processes are simplified as electrical contacts are not provided on the wafer in these examples. In these examples, the wafer chemistry is performed after the molded or overmolded regions are created if the temperatures of the wafer as amenable. In some situations, the temperature of the wafer in various parts of the process is too high to effectively apply wafer chemistry, but after the overmold is cured (which is discussed in greater detail below), the wafer temperature may be amenable for application of the chemistry. As was the case with the examples illustrated in FIGS. 2-3, the aspects in the examples below result in a more efficient utilization of the surface area of a wafer to create multiple lane options. As understood by one of skill in the art, in some circumstances, the deposition or polishing of a reconstituted and overmolded wafer can present challenges to maintaining the wafer chemistry, if it was previously applied. Thus, in this example, the polishing of the wafer precedes the application of chemistry in order to anticipate and possibly lessen or mitigate any issues caused by polishing after applying chemistry.

As illustrated in FIG. 4, a patterned wafer is diced (e.g., laser diced, saw diced, and/or separated with a scribe and break processes) (410). As with the workflow 300 of FIG. 3, here, too, the dicing may be adjusted to set parameters for the active surface of the flow cell in which a portion of the wafer will be implemented. The dicing creates perforations in the wafer such that the wafer is singulated along the perforations (420). The singulated portions of the wafer (e.g., dies) are placed on carrier tape, a temporary substrate or platform (e.g., utilizing a pick and place process) (430), forming reconstituted wafers (e.g., fanout wafers). As discussed in FIG. 6, from a single patterned wafer, more than one reconstituted wafer can be formed. As with the workflow 300 of FIG. 3, the placement on the carrier tape may be adjusted depending on the parameters and requirements of the resultant flow cell. The wafer portions on the carrier tape are then overmolded and the overmold is cured resulting in a hybrid glass and molded material substrate or wafer (440). Thus, the spaces between the various portions of the wafer comprised of the molding tape are filled. Once the overmold is cured, the surface chemistry can be applied to what will become the imaging areas of flow cells (450). Holes are drilled in the overmolded and cured wafer assembly to serve as fluidic inlets and outlets for the flow cell(s) (460). The two wafer assemblies (i.e., hybrid wafers) are then bonded to each other such that one wafer assembly is stacked on top of the other with an opposing longitudinal orientation (470). To create a fluidic channel in the resultant flow cell, a double-sided adhesive may be used for the bonding in order to create a space between the top surface of the molded material of the first wafer stack and the top surface of the molded material of the second wafer stack for a fluidic channel. The stacked wafer assembly which is a bonded wafer stack (comprised of hybrid wafers) is diced (480). As with the earlier examples, how many image areas are in the final diced product is dependent on the flow cell in which the final diced product will be utilized. In some examples, such as the example illustrated in FIG. 4, one patterned wafer yields three reconstituted wafers and two reconstituted wafers yields one bonded wafer stack.

As noted above, FIG. 5 illustrated a workflow 500 that was earlier depicted in FIG. 4, but FIG. 5 provides illustrations of aspects of an example of a process for forming active imaging surfaces for flow cells from a patterned wafer. Specifically, FIG. 5 illustrates an example for creating multiple lane options for flow cells from one wafer. As in FIG. 3, in FIG. 5, the illustrations above the line 501 show the aspects from a side view, while the illustrations below the line 501 depict the aspects from a top view. For ease of understanding, references are made to FIG. 4 throughout the description of aspects of FIG. 5, below.

Referring to FIG. 5, a patterned wafer is diced (e.g., laser diced, saw diced, and/or separated with a scribe and break processes) (510) (e.g., FIG. 4, 410) to create a wafer with perforations 511. This dicing may be adjusted to set parameters for the active surface of the flow cell in which a portion of the wafer will be implemented. The perforated wafer 511 is singulated (e.g., FIG. 4, 420) along the perforations created by the dicing and the singulated portions of the wafer (e.g., dies) are placed on carrier tape, a temporary substrate or platform (e.g., utilizing a pick and place process) (530) (e.g., FIG. 4, 430). The placement on the carrier tape may be adjusted depending on the parameters and requirements of the resultant flow cell. The wafer portions on the carrier tape 531 (i.e., the reconstituted wafer) are then overmolded and the overmold is cured, filling the spaces between the various portions of the wafer comprised of the molding tape resulting in a hybrid glass and molded material substrate or wafer (540) (e.g., FIG. 4, 440). After the overmolding molding and curing, the surface of the resultant wafer assembly 541 is flatter as the singulated wafers and the overmolded areas form a contiguous surface that may define one or more fluidic channels in a flow cell. Once the overmold is cured, the surface chemistry is applied to what will become the active areas of flow cells (e.g., the imaging areas) (550) (e.g., FIG. 4, 450). The surface chemistry may also serve to even out the surface of the wafer assembly 551 further. Holes are drilled in the overmolded and cured wafer assembly to serve as fluidic inlets and outlets for the flow cell(s) (560) (e.g., FIG. 4, 460). A stacked wafer assembly 571, also understood as a bonded wafer stack (comprised of hybrid wafers), is formed by bonding two wafer assemblies (i.e., hybrid wafers) to each other such that one wafer assembly is stacked on top of the other with an opposing longitudinal orientation (570) (e.g., FIG. 4, 470). To create a fluidic channel in the resultant flow cell, a double-sided adhesive may be used for the bonding in order to create a space between the top surface of the molded material of the first wafer stack and the top surface of the molded material of the second wafer stack for a fluidic channel. The bonded wafer stack 571 is diced to create multiple lane options for flow cells from one wafer (580) (e.g., FIG. 4, 480). As with the earlier examples, how many image areas are in the final diced product is dependent on the flow cell in which the final diced is utilized. In this example, as in FIG. 4, one patterned wafer yields three reconstituted wafers and two reconstituted wafers yields one bonded wafer stack.

As discussed above, various examples disclosed herein demonstrate an efficient utilization of a surface area of a wafer to create multiple lane options. These multiple lanes become the active surfaces of flow cells. One initial patterned wafer may yield a greater number of reconstituted wafers, which may yield more than one bonded wafer stack, which will yield lane options for more than one flow cell. Depending, for example, of the intended utilization of the resulting apparatus, in some examples, the active surfaces described herein can be further singulated, diced, and/or otherwise delineated or separated in smaller sub-active surfaces to increase wafer utilization.

Figure 6:
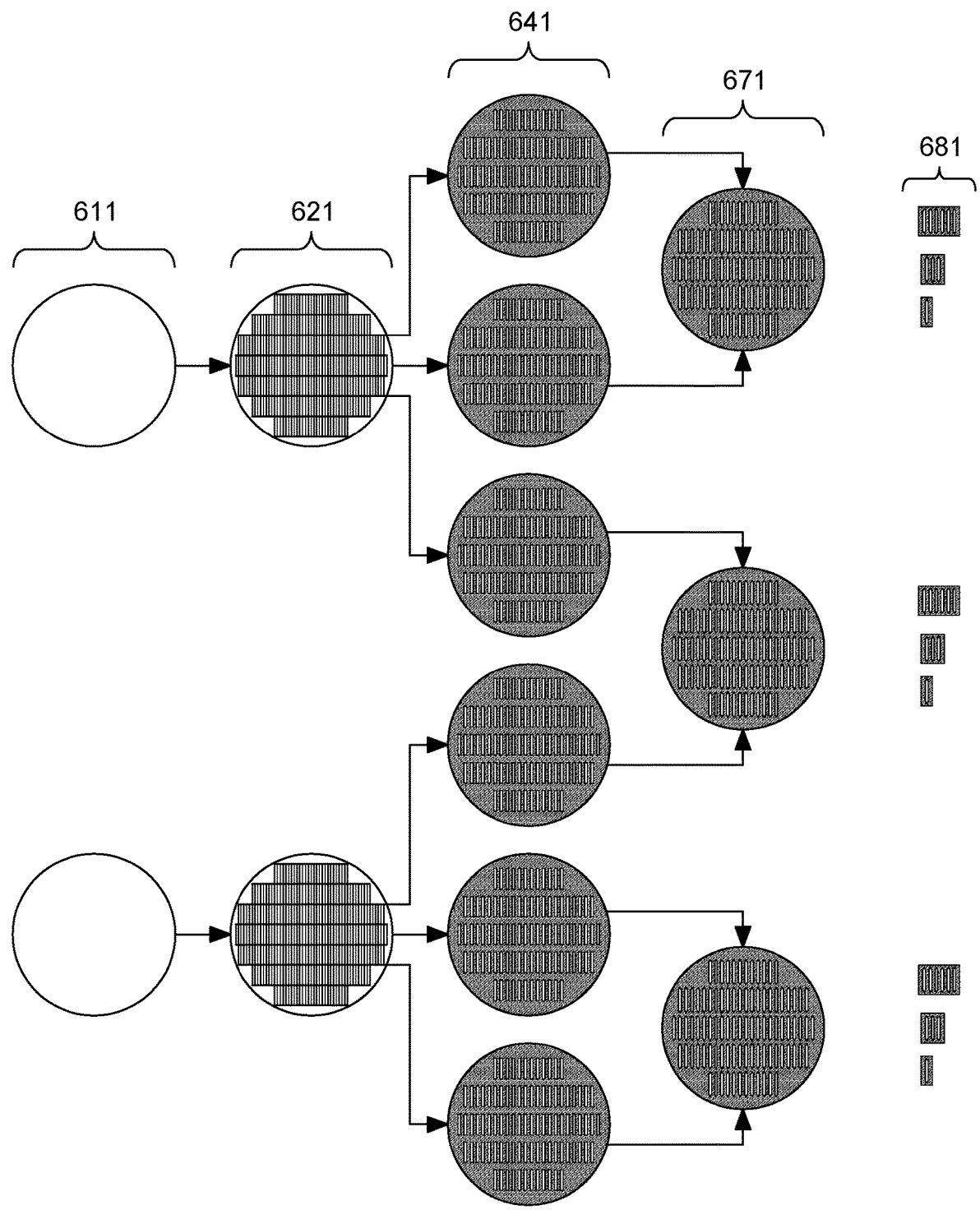
FIG. 6 demonstrates an example of an efficient utilization of a surface area of a wafer to create multiple lane options.

FIG. 6 illustrates one non-limiting example in order to illustrate this efficiency. In this particular non-limiting examples, two patterned wafers 611 yield six reconstituted wafers 641 and three bonded wafer stacks 671. (The initial patterned wafers 611 may or may not have surface chemistry applied to them.) To yield the flow cells 681 (with active surfaces), two patterned wafers 611 are diced to create perforated wafers 621, such that the wafer may be singulated along the perforations. The perforated wafers 621 are singulated and the singulated portions are placed (e.g., using a pick and place procedure), on carrier tape, a temporary substrate or platform. Each perforated wafer 621 yields three fanout wafers 641 (wafers comprised of the singulated portions of the patterned wafer spaced apart with the fanout tape). Once the reconstituted wafers 641 are overmolded and cured (surface chemistry may or may not be applied at this time), each two reconstituted wafers 641 can be bonded together to create bonded wafer stacks 671. It is these bonded wafer stacks (comprised of hybrid wafers) 671 which are diced to create multiple lane options (each lane including an active surface for a flow cell).

Figure 7:
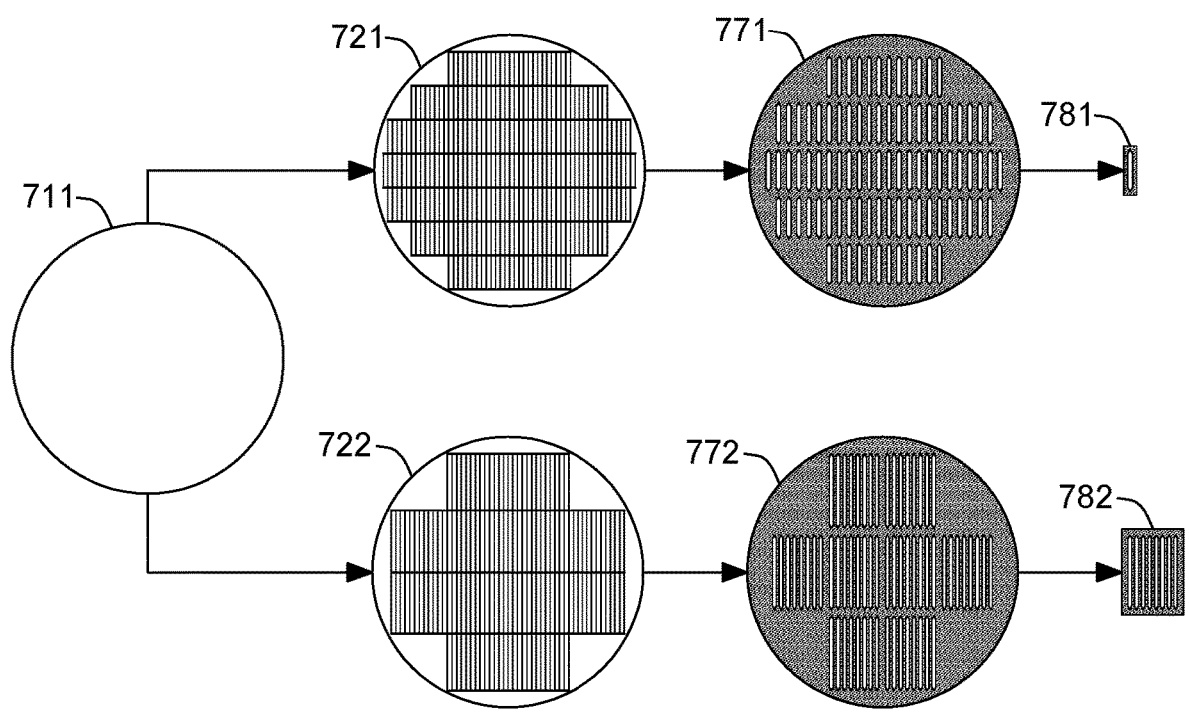
FIG. 7 depicts how the same or similar templates can be utilized to provide active image areas for different types of flow cells.

Another efficiency introduced by the examples herein is that the same template for dicing a patterned wafer, for use in a hybrid flow cell, can be utilized in a variety of different flow cells. This flexibility is enabled, at least in part, by adjusting the placement of singulated portions of a wafer on carrier tape, a temporary substrate or platform. To illustrate this advantage, FIG. 7 depicts how the same or a similar templates can be utilized to provide active image areas for two different types of flow cells. In FIG. 7, the two types of flow cells that were chosen to illustrate this advantage are Flow Cell A (a one lane flow cell) and Flow Cell B (an eight lane flow cell). These two types of flow cells were selected as non-limiting examples merely to provide an illustration for this advantage. As understood by one of skill in the art, the examples disclosed herein provide flexibility to enable the same or the similar template to be utilized to provide multiple flow cell lane options from one wafer. As illustrated in FIG. 7, a patterned wafer 711, is diced, with the dice recipe adjusted for an active area for the desired resultant flow cell. Hence, for Flow Cell A and Flow Cell B, the respective diced patterned wafers 721, 722, have a different perforation pattern. Similarly, the bonded wafer stacks (comprised of hybrid wafers) 771, 772 include differing orientations of the singulated portions of the wafer 711 on the carrier tape, a temporary substrate or platform. This is enabled by the recipe/interposer being adjusted for the different flow cell designs. The resultant flow cells 781, 782 differ based on the orientations of the singulated wafer portions on the carrier tape having differed. Hence, the same patterned wafer 711 is utilized, based on adjusting the dice pattern and the pattern for interposing the diced singulated wafer portions on the carrier tape. In the illustrated example, the resultant flow cells 781, 782 may be Flow Cell A and Flow Cell B, respectively.

Discussed herein are examples of fabricating a hybrid flow cell: 1) in which plastic of the hybrid flow cell is molded before a glass die is integrated into the hybrid flow cell (e.g., FIG. 1); and 2) in which the plastic is molded around the glass die (e.g., FIGS. 2-7). Both types of examples may or may not serve to: 1) increase utilization of expensive nanopatterned glass wafers (e.g., reducing fixed cost (FC) and cost of goods (COGs)); 2) increase the flexibility for nanopatterned wafers, by, for example, enabling utilization of the same nano-imprint lithography (NIL) template for multiple form factors; and/or 3) allow for new fluidic channel designs, which may improve flushing efficiency, reduce reagent consumption, and decrease fluidic cycle times.

Figure 8:
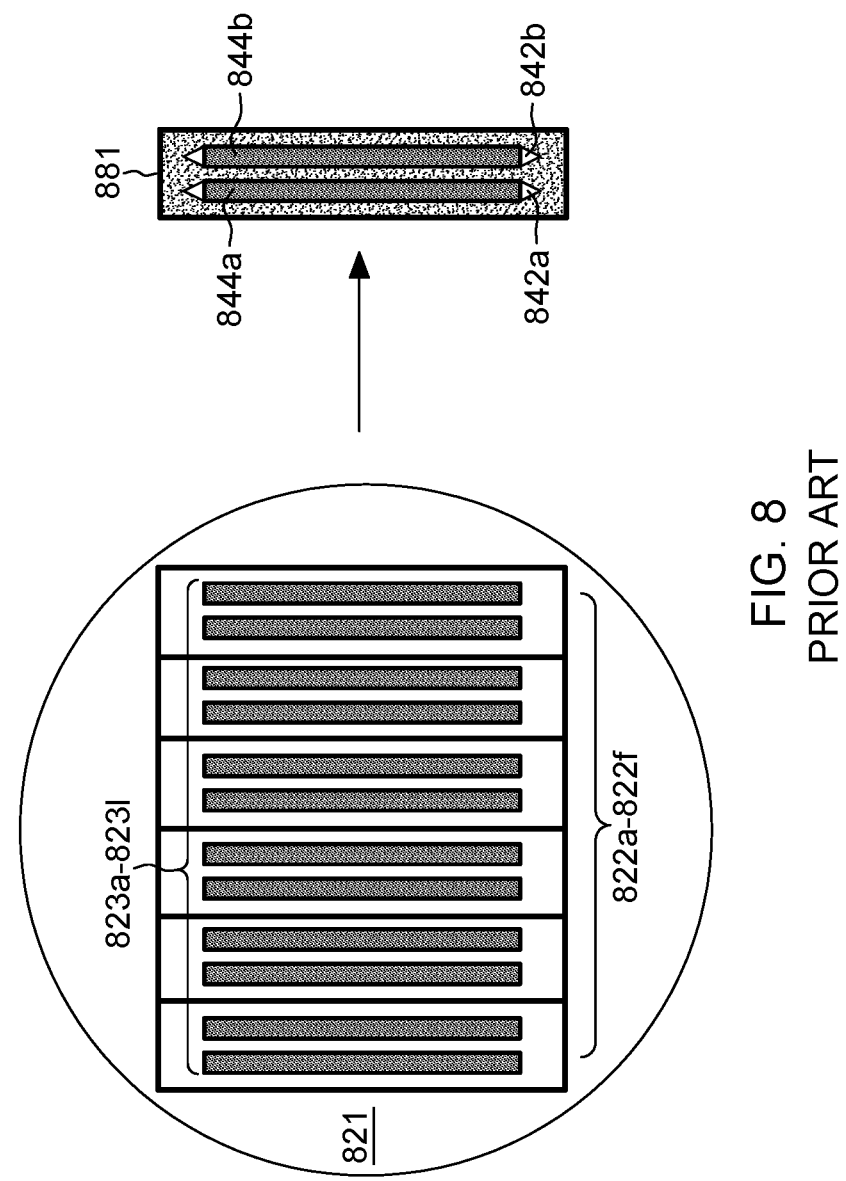
FIG. 8 depicts an existing method of singulating a wafer to form portions of fluidic channels in flow cells from the singulated portions of the wafer.
Figure 9:
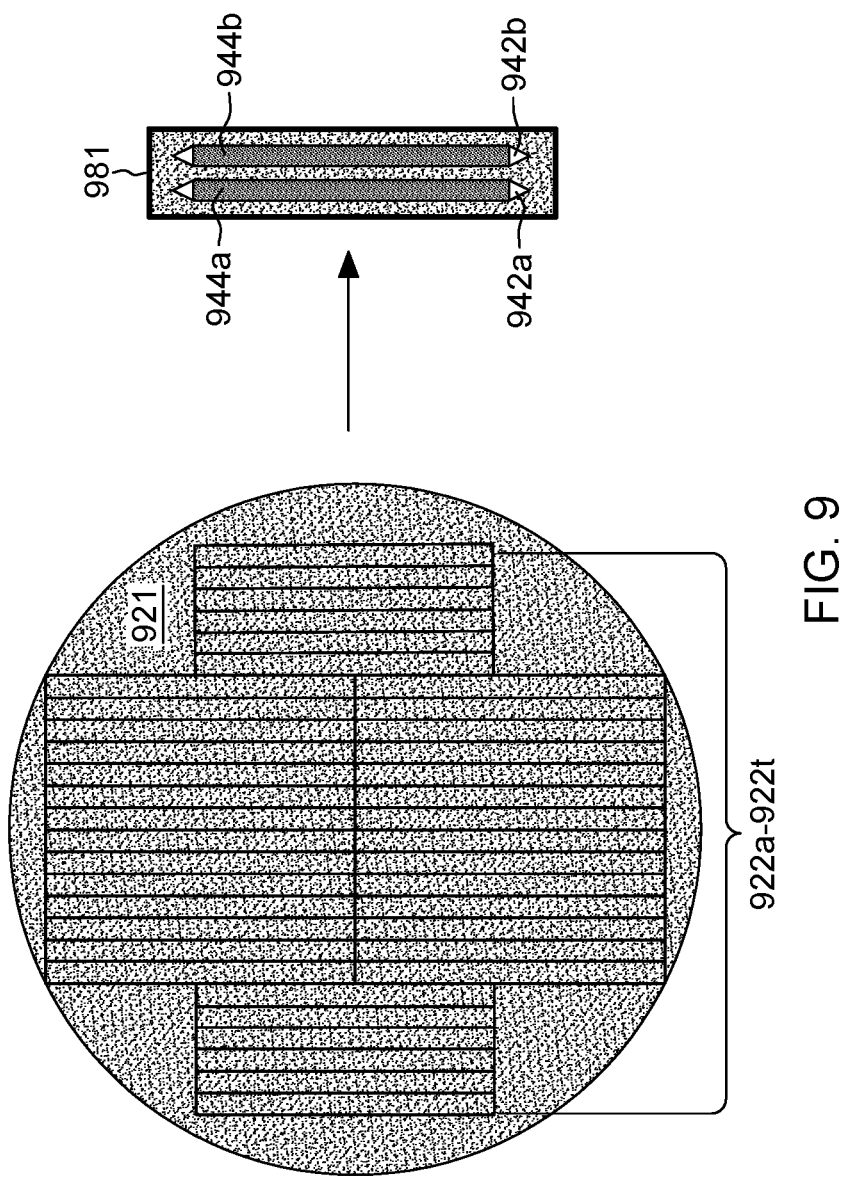
FIG. 9 depicts how aspects of certain examples described herein improve efficiencies in methods of singulating a wafer to form portions of fluidic channels in flow cells from the singulated portions of the wafer.

As noted above, the examples herein represent improvements on wafer utilization and efficiency when contrasted with certain existing methods. To that end, FIG. 8 is an example of how a given existing method would dice a wafer for utilization as one or more active surfaces within a flow cell. Meanwhile, FIG. 9 is an example of how the aspects of the examples herein can be utilized on the same or a substantially similar wafer in order to yield more flow cells of the same or of a substantially similar structure. Additionally, FIG. 10 is an example of how a given existing method would dice a wafer for utilization as one or more active surfaces within a flow cell and FIG. 11 is an example of how the aspects of the examples herein can be utilized on the same or a substantially similar wafer in order to yield more flow cells of the same or of a substantially similar structure.

FIG. 8 is an example of how two (2) of a depicted wafer 821 are used to form six (6) flow cells which are structured like flow cell 881. Flow cell 881 includes two fluidic channels 842a-842b each with an active surface 844a-844b; each active surface is utilized for sensing (e.g., nanowell patterning). In FIG. 8, a diced wafer 821 is pictured where the indicated (diced and soon-to-be singulated) pieces 822a-822f, will be used to form the fluidic channels 842a-842b in individual flow cells, such as flow cell 881. The shaded areas 823a-823l, become active surfaces 844a-844b in resultant flow cells, such as flow cell 881. As each flow cell in this example represents a stacking of two singulated pieces of the original wafer 821, for each two (2) wafers 821 (only one is pictured), six (6) flow cells may be formed.

FIG. 9 is an example that starts with a wafer 921 that is substantially similar and/or identical to the wafer 821 of FIG. 8. But when the wafer 921 is diced and singulated, unlike in FIG. 8, where the cutouts 822a-822f include the active areas 823a-823l, the cutouts 922a-922t in FIG. 9, are utilized, in their entireties or substantial entireties, as the active areas 944a-944b of the resultant flow cells 981. A region outside of the active areas 944a-944b that is part of the fluidic channels 942a-942b, is not formed from the wafer 921, but, rather, may be formed, for example, from a molded plastic (see, e.g., FIG. 1), and/or by curing material on a region of carrier tape adjacent to a piece of singulated wafer (see, e.g., FIGS. 2-7). Thus, instead of two (2) wafers (FIG. 8), each like wafer 821, providing material for six (6) flow cells, each like flow cell 881 (FIG. 8), in FIG. 9, two (2) wafers like wafer 921, provide material for forming twenty (20) flow cells, like flow cell 981.

Figure 10:
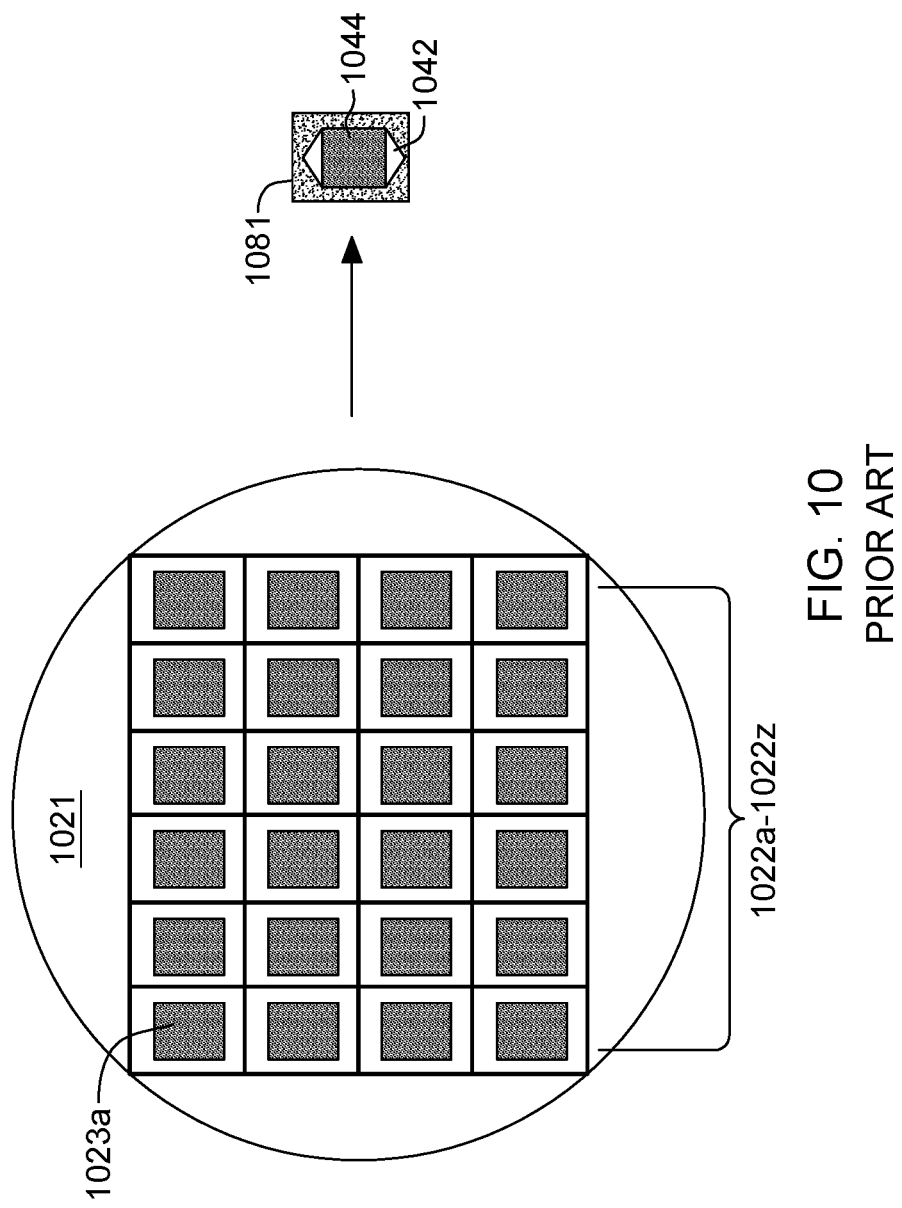
FIG. 10 depicts an existing method of singulating a wafer to form portions of fluidic channels in flow cells from the singulated portions of the wafer.
Figure 11:
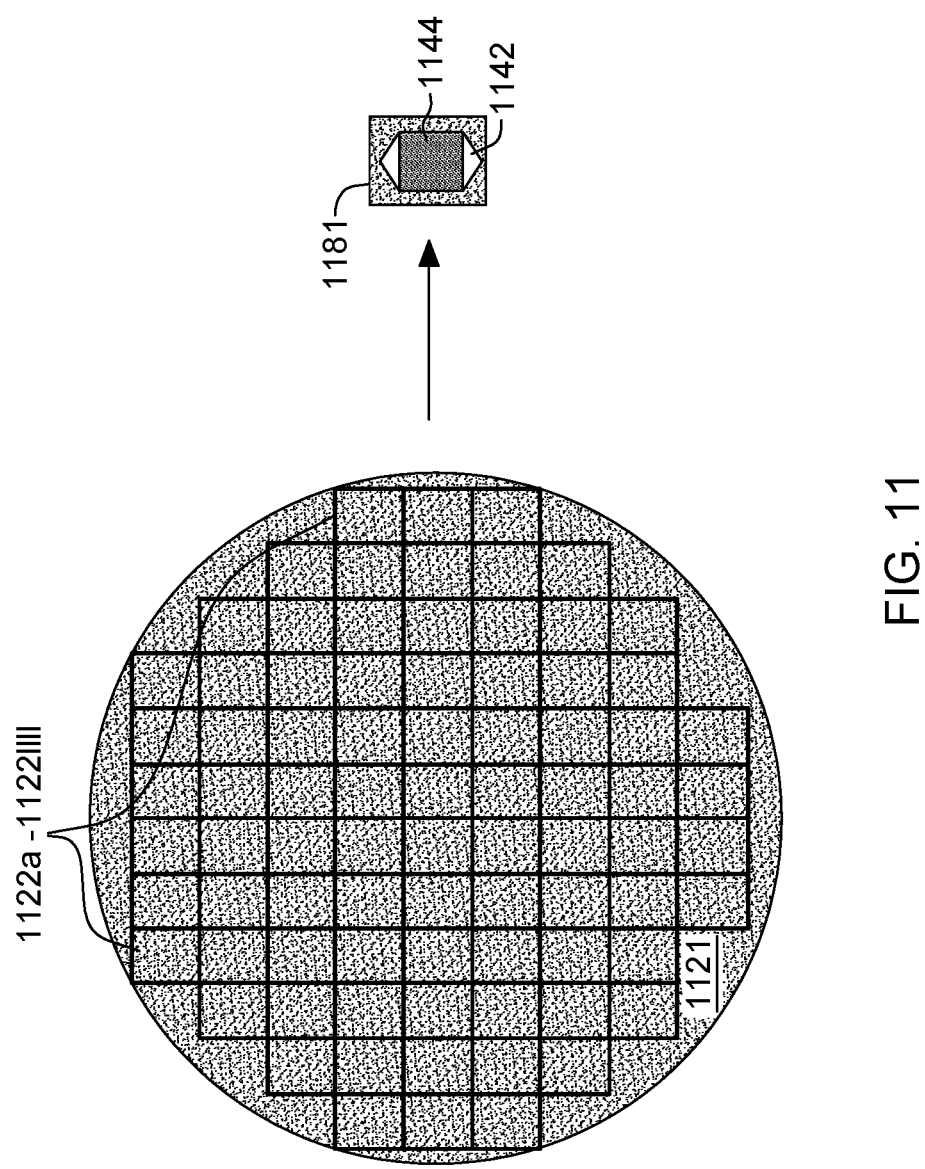
FIG. 11 depicts how aspects of certain examples described herein improve efficiencies in methods of singulating a wafer to form portions of fluidic channels in flow cells from the singulated portions of the wafer.

FIG. 10 depicts an example of how two (2) of a depicted wafer 1021 are used to form twenty-four (24) flow cells, of the structure of flow cell 1081. As with the example on FIG. 8, a diced wafer 1021 is pictured where the indicated (diced and soon-to-be singulated) pieces 1022a-1022z, will each be used to form a fluidic channel 1042 in an individual flow cells, such as flow cell 1081. Each of the fluidic channels 1042 (formed from (in this example), two pieces 1022a-1022z) includes an active surface 1044. The shaded areas, like shaded area 1023a, each become part of an active surface 1044 in resultant flow cells, such as flow cell 1081. As each flow cell in this example represents a stacking of two singulated pieces of the original wafer 1021, for each two (2) wafers 1021 (only one is pictured), twenty-four (24) flow cells may be formed.

FIG. 11 is an example that starts with a wafer 1121 that is substantially similar and/or identical to the wafer 1021 of FIG. 10. But when the wafer 1121 is diced and singulated, unlike in FIG. 10, where the cutouts 1022a-1022z include the active areas 1023a-1023z, the cutouts 1022a-10221111 in FIG. 11, are utilized, in their entireties or substantial entireties, as the active areas, such as active area 1144 of the resultant flow cells, such as flow cell 1181. A region outside of the active areas 1144 that is part of the fluidic channels 1142, is not formed from the wafer 1121, but, rather, may be formed, for example, from a molded plastic (see, e.g., FIG. 1), and/or by curing material on a region of carrier tape adjacent to a piece of singulated wafer (see, e.g., FIGS. 2-7). Thus, instead of two (2) wafers (FIG. 10), each like wafer 1021, providing material for twenty-four (24) flow cells, each like flow cell 1081 (FIG. 10), in FIG. 11, two (2) wafers like wafer 1121, provide material for forming eighty-two (82) flow cells, like flow cell 1181.

Examples described herein include examples of a method that includes for each patterned wafer of at least two patterned wafers, performing chemical processes on a surface of the patterned wafer to prepare the surface of the patterned wafer to add specific chemical functionality to the surface. The method may also include singulating the wafer into individual dies, where each individual die comprises an active area of a given flow cell. The method may also include orienting each die on a temporary substrate, where the orienting creates spaces between each individual die. The method may also include molding a material over the spaces such that a top surface of the molded material is contiguous with a portion of the top surface of each active area to create a hybrid wafer comprised of glass and molded material. The method may also include bonding a first hybrid wafer formed from a first patterned wafer of the at least two patterned wafers to a second hybrid wafer formed from a second patterned wafer of the at least two patterned wafers, where the bonding couples the top surface of the molded material of the first hybrid wafer to the top surface of the molded material of the second hybrid wafer, forming a bonded wafer stack.

In some examples, the two or more patterned wafers are selected from the group consisting of: circular wafers and non-circular panels.

In some examples, the two or more patterned wafers comprise glass.

In some examples, the singulating comprises perforating the patterned wafer utilizing a technique selected from the group consisting of: laser dicing the patterned wafer, saw dicing the patterned wafer, and scribe and break processing the patterned wafer.

In some examples, the technique comprises laser dicing and the laser dicing comprises: laser dicing the patterned wafer to create perforations between the dies; and separating the patterned wafer into the dies at those perforations.

In some examples, the orienting is accomplished by utilizing a pick and place process.

In some examples, the bonding comprises utilizing a double-sided adhesive, where a thickness of the double sided adhesive creates a space between the top surface of the molded material of the first hybrid wafer and the top surface of the molded material of the second hybrid wafer, for a fluidic channel.

In some examples, the method may also include dicing the bonded wafer stack to form at least one flow cell.

In some examples, the molding further comprises drilling holes in the molded material as fluidic inlets and outlets for the at least one flow cell.

In some examples, the material utilized in the molding comprises plastic.

In some examples, molding the material over the spaces comprises overmolding the material on the temporary substrate and curing the material.

In some examples, each flow cell of the at least one flow cell comprises between 1 to 6 active areas.

In some examples, performing the chemical processes comprises coating the patterned wafer with one or more functional layers.

In some examples, performing the chemical processes comprises: treating the surface of the patterned wafer; coating the surface of the patterned wafer with a hydrogel; and polishing the surface of the patterned wafer.

In some examples, the temporary substrate comprises an adhesive.

In some examples, singulating the wafer into the individual dies comprises: singulating the wafer into an initial set of singulated dies and singulating each die of the initial set of singulated dies into one or more pieces. In these examples, the one or more pieces of each die of the initial set of singulated dies comprise the individual dies.

Examples described herein include examples of a method that includes, for each patterned wafer of at least two patterned wafers, singulating the wafer into individual dies, where each die comprises an active area of a given flow cell. The method may also include orienting each individual die on a temporary substrate, where the orienting creates spaces between each individual die. The method may also include molding a material over the spaces such that a top surface of the molded material is contiguous with a portion of the top surface of each active area to create a hybrid wafer comprised of glass and molded material. The method may also include performing chemical processes on a surface of the hybrid wafer to add specific chemical functionality to the surface. The method may also include bonding a first hybrid wafer formed from a first patterned wafer of the at least two patterned wafers to a second hybrid wafer formed from a second patterned wafer of the at least two patterned wafers, where the bonding couples the top surface of the molded material of the first hybrid wafer to the top surface of the molded material of the second hybrid wafer, forming a bonded wafer stack.

In some examples, the two or more patterned wafers are selected from the group consisting of: circular wafers and non-circular panels.

In some examples, the two or more patterned wafers comprise glass.

In some examples, the singulating comprises perforating the patterned wafer utilizing a technique selected from the group consisting of: laser dicing the patterned wafer, saw dicing the patterned wafer, and scribe and break processing the patterned wafer.

In some examples, the technique comprises laser dicing and the laser dicing comprises: laser dicing the patterned wafer to create perforations between the dies; and separating the patterned wafer into the dies at those perforations.

In some examples, the orienting is accomplished by utilizing a pick and place process.

In some examples, the bonding comprises utilizing a double-sided adhesive, where a thickness of the double sided adhesive creates a space between the top surface of the molded material of the first wafer stack and the top surface of the molded material of the second wafer stack, for a fluidic channel.

In some examples, the method also includes dicing the bonded wafer stack to form at least one flow cell.

In some examples, the molding further comprises drilling holes in the molded material as fluidic inlets and outlets for the at least one flow cell.

In some examples, the material utilized in the molding comprises plastic.

In some examples, molding the material over the spaces comprises overmolding the material on the temporary substrate and curing the material.

In some examples, each flow cell of the at least one flow cell comprises between 1 to 6 active areas.

In some examples, performing the chemical processes comprises coating the patterned wafer with one or more functional layers.

In some examples, performing the chemical processes comprises: treating the surface of the patterned wafer; coating the surface of the patterned wafer with a hydrogel; and polishing the surface of the patterned wafer.

In some examples, the temporary substrate comprises an adhesive.

In some examples, singulating the wafer into the individual dies comprises: singulating the wafer into an initial set of singulated dies and singulating each die of the initial set of singulated dies into one or more pieces. In these examples, the one or more pieces of each die of the initial set of singulated dies comprise the individual dies.

Examples described herein include examples of a method that includes dicing a patterned wafer into dies comprising active surfaces. The method may also include singulating the dies based on perforations created by the dicing. The method may also include assembling each die into a flow cell, the assembling comprising: picking and placing the die into an injection molded flow channel formed in a molded flow cell bottom; and covering a top surface of molded flow cell bottom with a molded flow cell lid.

In some examples, the die comprises imaging glass.

In some examples, the method may also include performing chemical processes on a surface of the patterned wafer to prepare the surface of the patterned wafer to add specific chemical functionality to the surface.

In some examples, the method may also include securing the die into the molded flow channel.

In some examples, the securing is accomplished utilizing a fastener selected from the group consisting of: an epoxy and a heat stake.

In some examples, dicing the patterned wafer into the dies comprising the active surfaces comprises: dicing the wafer into an initial set of singulated dies and dicing each die of the initial set of singulated dies into one or more pieces. In these examples, the one or more pieces of each die of the initial set of singulated dies comprise the active surfaces.

The flowchart and block diagrams in the Figures illustrate the architecture, functionality, and operation of possible implementations of systems, methods, and computer program products according to various examples of the present implementation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, processes, operations, elements, and/or components, but do not preclude the presence or addition of one or more other features, integers, steps, processes, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more examples has been presented for purposes of illustration and description, but is not intended to be exhaustive or limited to in the form disclosed. Many modifications and variations will be apparent to those of ordinary skill in the art. The example was chosen and described in order to best explain various aspects and the practical application, and to enable others of ordinary skill in the art to understand various examples with various modifications as are suited to the particular use contemplated.

It should be appreciated that all combinations of the foregoing concepts and additional concepts discussed in greater detail below (provided such concepts are not mutually inconsistent) are contemplated as being part of the subject matter disclosed herein at least to achieve the benefits as described herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely provided by way of example. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

What is claimed is:

1. A method comprising:
for each patterned wafer of at least two patterned wafers:
performing chemical processes on a surface of the patterned wafer to prepare the surface of the patterned wafer to add specific chemical functionality to the surface;
singulating the wafer into individual dies, wherein each individual die comprises an active area of a given flow cell;
orienting each die on a temporary substrate, wherein the orienting creates spaces between each individual die; and
molding a material over the spaces such that a top surface of the molded material is contiguous with a portion of the top surface of each active area to create a hybrid wafer comprised of glass and molded material; and
bonding a first hybrid wafer formed from a first patterned wafer of the at least two patterned wafers to a second hybrid wafer formed from a second patterned wafer of the at least two patterned wafers, wherein the bonding couples the top surface of the molded material of the first hybrid wafer to the top surface of the molded material of the second hybrid wafer, forming a bonded wafer stack.

2. The method of claim 1, wherein the two or more patterned wafers are selected from the group consisting of: circular wafers and non-circular panels.

3. The method of claim 1, wherein the two or more patterned wafers comprise glass.

4. The method of any of claim 1, wherein the singulating comprises perforating the patterned wafer utilizing a technique selected from the group consisting of: laser dicing the patterned wafer, saw dicing the patterned wafer, and scribe and break processing the patterned wafer.

5. The method of claim 1, wherein the orienting is accomplished by utilizing a pick and place process.

6. The method of claim 1, wherein the bonding comprises utilizing a double-sided adhesive, wherein a thickness of the double sided adhesive creates a space between the top surface of the molded material of the first hybrid wafer and the top surface of the molded material of the second hybrid wafer, for a fluidic channel.

7. The method of claim 1, further comprising:
dicing the bonded wafer stack to form at least one flow cell.

8. The method of claim 1, wherein molding the material over the spaces comprises overmolding the material on the temporary substrate and curing the material.

9. The method of claim 1, wherein each flow cell of the at least one flow cell comprises between 1 to 6 active areas.

10. The method of claim 1, wherein performing the chemical processes comprises:
treating the surface of the patterned wafer;
coating the surface of the patterned wafer with a hydrogel; and
polishing the surface of the patterned wafer.

11. The method of claim 1, wherein singulating the wafer into the individual dies comprises:
singulating the wafer into an initial set of singulated dies; and
singulating each die of the initial set of singulated dies into one or more pieces, wherein the one or more pieces of each die of the initial set of singulated dies comprise the individual dies.

* * * * *